May 11, 1971  H. H. HARDING  3,578,526
METHOD OF MAKING REINFORCED HONEYCOMB SANDWICH
Filed Jan. 22, 1968  3 Sheets-Sheet 1
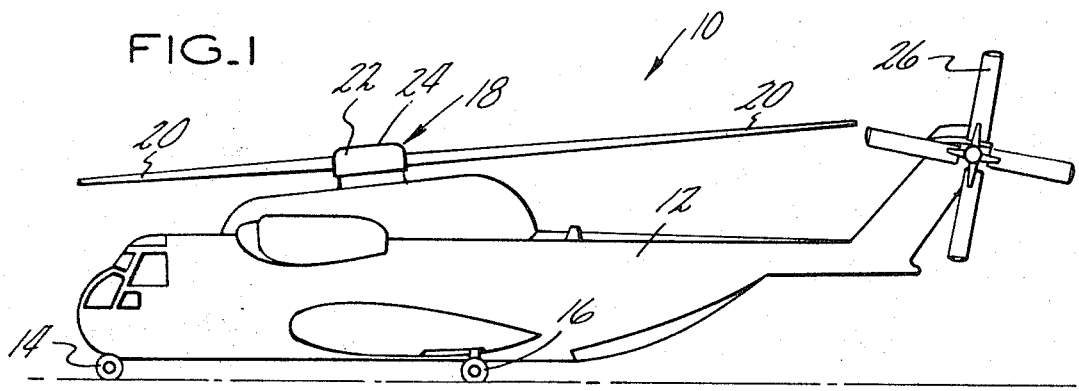
FIG.1
FIG.2
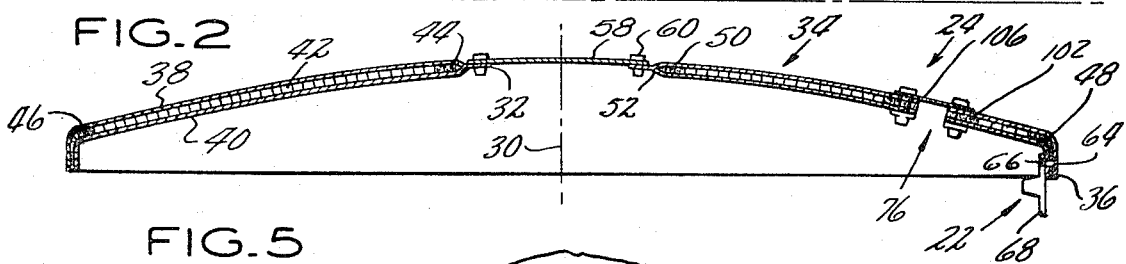
FIG.5
FIG.7
INVENTOR.
HOWARD H. HARDING
BY
Vernon F. Hauschild
ATTORNEY May 11, 1971  H. H. HARDING  3,578,526
METHOD OF MAKING REINFORCED HONEYCOMB SANDWICH
Filed Jan. 22, 1968  3 Sheets-Sheet 2
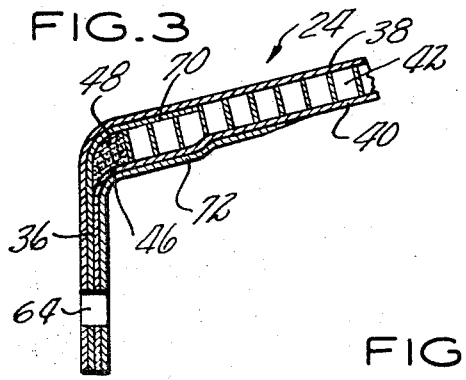
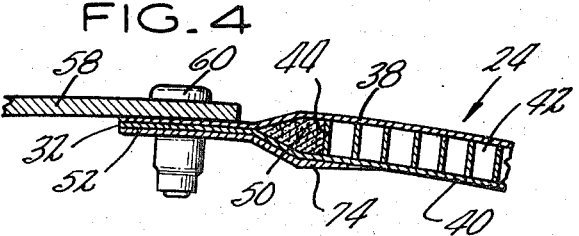
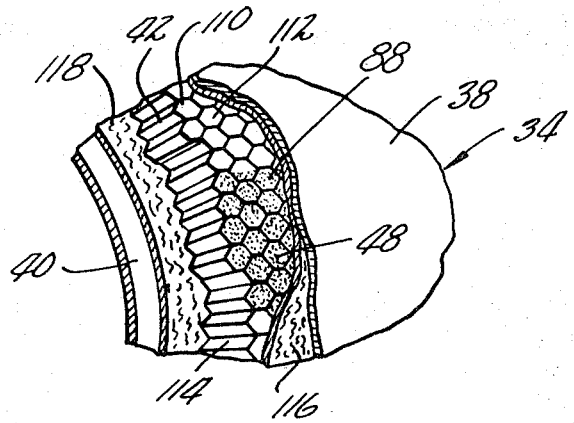
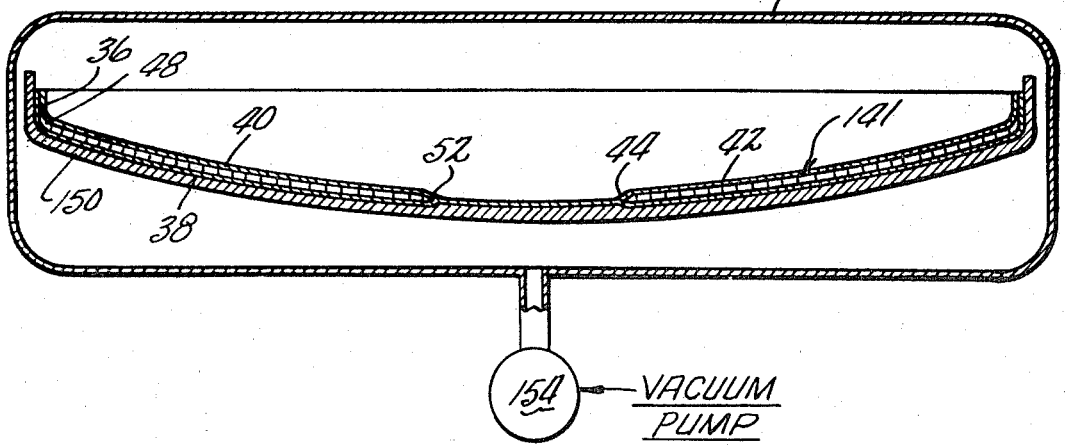
INVENTOR.
HOWARD H. HARDING
BY
Vernon F. Hauschild
ATTORNEY May 11, 1971 H. H. HARDING 3,578,526
METHOD OF MAKING REINFORCED HONEYCOMB SANDWICH
Filed Jan. 22, 1968 3 Sheets-Sheet 3
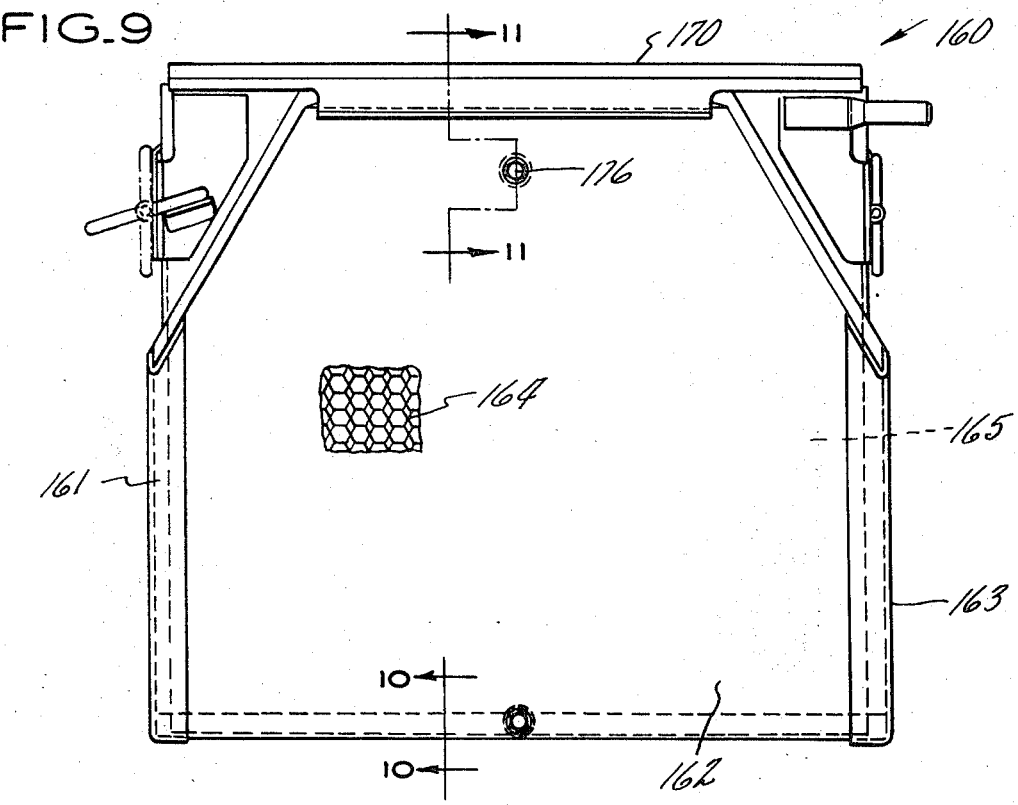
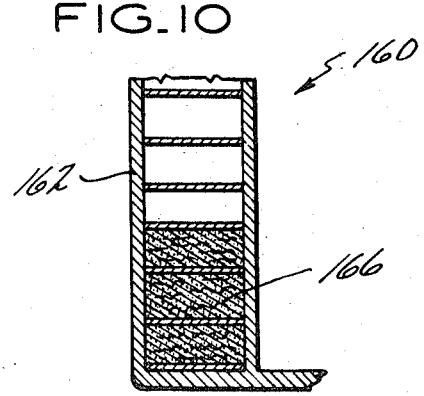
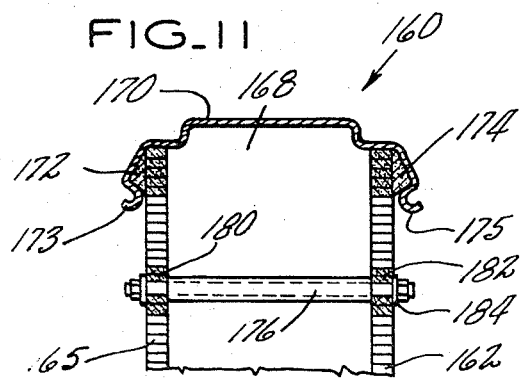
INVENTOR.
HOWARD H. HARDING
BY
Vernon F. Hamachild
ATTORNEY

3,578,526
METHOD OF MAKING REINFORCED HONEYCOMB SANDWICH
Howard H. Harding, Bridgeport, Conn., assignor to United Aircraft Corporation, East Hartford, Conn.
Filed Jan. 22, 1968, Ser. No. 701,528
Int. Cl. B29c 27/00
U.S. Cl. 156—242        23 Claims

ABSTRACT OF THE DISCLOSURE

A lightweight, sandwich construction comprising a honeycomb core member with end-grain balsa wood impressed thereinto to fill the cells thereof at selected positions for the purpose of strengthening the honeycomb for machining or load carrying such as bolt retention and preferably including plastic impregnated fiber glass sheets adhesively bonded to the opposite sides of the end-grain balsa wood impressed honeycomb core to form a sandwich construction thereof and the method of so fabricating such sandwich construction.

BACKGROUND OF THE INVENTION

Field of invention

This invention relates to lightweight devices and the method of manufacturing same and more particularly to wall or sheet parts made of a honeycomb core and having end-grain balsa wood impressed into the honeycomb core cells to provide block compression resistance thereto and to permit machining thereof if necessary and preferably includes top and bottom layers of plastic impregnated fiber glass or other nonporous protective sheet members on opposite sides of the honeycomb sheet so as to produce a sandwich construction therewith.

It has long been recognized that honeycomb is of very lightweight yet sturdy construction and parts made thereof, preferably with the honeycomb used as the core of a sandwich skin or wall construction, are very lightweight and ideally suited for use in aircraft and other fields where lightweight wall or skin members are needed which are capable of being faired to have a smooth aerodynamic surface and of being selectively contoured for use as nonstructural aircraft parts.

Honeycomb construction, however, is almost impossible to machine and is also incapable of withstanding a compressive load so that problems have been encountered in crushing the honeycomb when passing a connecting bolt therethrough. It is accordingly the practice to reinforce the honeycomb in regions which must carry extra weight, such as cargo weight, and receive compressive loads such as hinge areas and other areas requiring a through-bolt.

In the past, honeycomb has been filled with water and then frozen to permit its machining as described in Griffith et al. Pat. No. 2,855,664, Schaefer Pat. No. 2,731,713. Paraffin has been used in the honeycomb cells to prevent collapsing as in U.S. Pat. No. 3,196,533 and rigidizers of all types have been used in honeycomb cores to provide strength thereto as in Fisher Pat. No. 3,173,520, Hall Pat. No. 2,988,809 and others.

Each of these methods known in the prior art to provide support to honeycomb material have substantial limitations. For example, the use of ice is quite impractical and can be used for machining the honeycomb only when the machining process is of very short duration and, of course, the short duration of the frozen state at room and atmospheric temperature would prevent this construction being used in flight articles since the rapid melting of the ice would cause the honeycomb to lose its rigidity in a very short time period. The paraffin is not acceptable because paraffin would not support the honeycomb cells. It would have a tendency to squeeze out since it is not a rigid material. Paraffin would also inhibit the bond between the honeycomb cell and the fiber glass or other sheet material which one might be using. The honeycomb cells would have to be heated to melt the paraffin wax out of the cells before using the honeycomb. This would cause a great deal more expense and an additional operation in fabricating the sandwich assembly. Also, paraffin cannot be bonded to the honeycomb cell walls as end-grain balsa wood. Further, since paraffin has a very low melting point and if it was possible to laminate or bond the sandwich assembly together with the paraffin still inside the honeycomb, the paraffin would melt during operating temperatures of the aircraft, probably causing failure of the assembly.

With respect to the rigidizers, such as Epocast and Microballon, such rigidizer material is comparatively heavy weighing 35–40 pounds per cubic foot and needs to be carefully weighed out and mixed from three containers, namely the container for the rigidizer, the container for the base and the container for the accelerator. In addition, the honeycomb area need be masked before application of the fluid rigidizer into the honeycomb cells. Further, under certain circumstances a pressure gun, such as a caulking gun is necessary to inject the liquid rigidizer into the honeycomb cells. The mixing, masking and rigidizer application are very time consuming and this problem is added to by the fact that the rigidizer must be permitted to settle out once it has been introduced in liquid form into the honeycomb cells so that air bubbles will free themselves from the rigidizer material. The rigidizer material must then be cured at about 140° F. for a minimum of one hour and shrinkage of the rigidizer will undoubtedly be encountered and this will require repeating the entire process to fill in the voids caused by rigidizer shrinking. After the rigidizer is finally cured, it must be sanded so that it is exactly the same height as the honeycomb so as to prevent a "bridging effect" with respect to the fiber glass which will eventually be placed on opposite sides of the honeycomb and caused to adhere thereto to produce a sandwich construction. If the honeycomb is not of the same height or thickness as the rigidizer, this "bridging effect" will leave a portion of the fiber glass sheet unsupported and make it highly subject to rupture. Following the sanding process to bring about equal height of honeycomb and rigidizer, it is then necessary to completely clean the sanding debris before the fiber glass is applied.

In addition, our experience has been that many people find the presently available rigidizers to be toxic and find themselves to be allergic to them so that it is standard practice to work with the rigidizer in a ventilated booth. A further disadvantage found with respect to the rigidizers is the fact that additional gas is emitted by the rigidizer during the curing process and this adversely affects the bond between the fiber glass cloth and the honeycomb core.

If the part being fabricated is of selected shape as opposed to flat, the rigidizer must be poured with the honeycomb so shaped and the curing must take place with the honeycomb so shaped and this, of course, adds complication to the entire process and hence makes it even more time consuming and the end product is undesirably heavy.

SUMMARY OF THE INVENTION

A primary object of the present invention is to provide means and method for supporting honeycomb in a sandwich construction so as to improve the block compression resistance thereof and to permit machining and other fabricating and contouring of the honeycomb.

In accordance with the present invention the honeycomb is provided with the necessary rigidity and compression resistance by impressing end-grain balsa wood into the honeycomb cells so as to completely fill the cells. It is important that the balsa wood grain run parallel to the axis of the honeycomb cells or interstices during the operation of pressing the end-grain balsa wood into the honeycomb. Preferably, the end-grain balsa wood is of the same height as the honeycomb cells and is of selected shape to produce reinforcement throughout the area desired.

In accordance with the further aspect of the present invention, an adhesive such as a low viscosity epoxy resin is applied to the surface of the end-grain balsa wood after it is impressed in the honeycomb and will be absorbed into the end-grain balsa wood to cause adherence between the end-grain balsa wood and the honeycomb cell structure.

In accordance with the further aspect of the present invention, and in order to produce a sandwich construction, nonporous sheet material is adhesively bonded to the opposite sides of the honeycomb with the end-grain balsa wood so impressed and this protective sheet material is preferably plastic impregnated fiber glass cloth.

In accordance with still a further aspect of the present invention, whenever the honeycomb structure with the end-grain balsa wood impressed thereinto is machined so as to leave a portion of the end-grain balsa wood exposed to atmosphere, a sealant is spread over the exposed end-grain balsa wood to prevent moisture and fungus accumulation.

The invention provides a reinforced honeycomb core sandwich construction which is much lighter in weight than previous constructions, which is fabricated with greater ease and with substantial time saving and which is highly adaptable to use in aircraft parts and which produces smooth aerodynamic exterior surfaces and is highly acceptable to connection to adjacent parts and even into apertures in adjacent parts.

In accordance with still a further aspect of the present invention, a sandwich construction as described above can be fabricated to any desired contour by impressing end-grain balsa wood of desired shape and size into the honeycomb cells by means of a press and placing this end-grain balsa wood impregnated honeycomb into a properly contoured female die between at least one layer of plastic impregnated fiber glass cloth on opposite sides thereof, and with additional fiber glass reinforcement wherever desired, then producing a vacuum about said structure by the use of a conventional vacuum bag and then placing the entire die, structure and evacuated vacuum bag into an autoclave under desired pressure and temperature for heat treatment as described hereinafter. Any apertures which are to be made through the sandwich construction so formed may then be cut or machined due to the support which the end-grain balsa wood provide to the honeycomb core and the edges of the fiber glass cloth may be cut to desired shape and length.

The invention permits reinforcing a honeycomb sheet by impressing into the cells of the honeycomb sheet end-grain balsa wood which may be purchased of any desired thickness so as to be the same thickness as the honeycomb sheet and hence flush therewith when so impressed, which can be cut to any desired shape either before being impressed into the honeycomb or thereafter, which is extremely light in weight and nontoxic. The invention is particularly well adapted for use in a sandwich construction wherein the honeycomb sheet with impressed end-grain balsa wood reinforcement at selected positions or throughout serves as the core of the sandwich construction between layers of plastic impregnated fiber glass cloth which are caused to adhere to the opposite sides of the core member, thereby providing a smooth aerodynamic surface for the sandwich construction and providing a moisture seal for the end-grain balsa wood. In addition, this sandwich construction is particularly well adapted for peripheral sealing and attachment to adjacent parts in that the top and bottom layers of the plastic impregnated fiber glass cloth can extend beyond the core and so that, during the curing process, the top and bottom layers of fiber glass cloth can be caused to adhere to one another externally of the core thereby serving as a peripheral for the core and a flange to permit attachment of the sandwich construction member to adjacent parts.

BRIEF DESCRIPTION OF THE DRAWINGS

FIG. 1 is a showing of a modern helicopter utilizing a rotor cap made of the end-grain balsa wood reinforced honeycomb core sandwich construction taught herein.

FIG. 2 is a cross-sectional showing of a conventional helicopter rotor cap fabricated of this construction and taken along line 2—2 of FIG. 5.

FIG. 3 is an enlarged cross-sectional showing of the outer edge seal and rim of the rotor cap shown in FIG. 2.

FIG. 4 is an enlarged cross-sectional showing of the inner portion of the rotor cap shown in FIG. 2 with its inner seal and connecting flange.

FIG. 5 is a top view of the helicopter rotor cap shown in FIGS. 1 and 2.

FIG. 6 is a perspective showing of the sandwich skin or wall construction taught herein, partially broken away to illustrate the layers of material which make up the sandwich construction.

FIG. 7 is a showing of a press in which the end-grain balsa wood is ready to be pressed into the cores of the honeycomb.

FIG. 8 is a showing of a specifically contoured cover member of sandwich construction being fabricated within a female die and having the vacuum creating bag enveloping the die and its contents.

FIG. 9 is a front view of an ammunition box made of a series of sandwich construction wall members of the type taught herein.

FIG. 10 is a view taken along line 10—10 of FIG. 9.

FIG. 11 is a view taken along line 11—11 of FIG. 9.

DESCRIPTION OF THE PREFERRED EMBODIMENT

While this invention relates to a reinforced honeycomb construction with end-grain balsa wood impressed into the honeycomb cells so as to add strength to the honeycomb to permit it to take bolt loads and the like, and to permit machining or other cutting of the honeycomb for the eventual use in a sandwich-type construction, for the purpose of describing the invention its use in the fabrication of a rotor cap for use with a helicopter rotor has been chosen but, it will be evident to those skilled in the art that the construction has many other applications. This particular product and its method of manufacture are chosen to illustrate the invention because the helicopter rotor cap must be rigid in shape, yet light in weight, and must also be capable of presenting a smooth aerodynamic surface to the air passing thereover, and at the same time be capable of absorbing bolt loading for the purpose of attachment to the rotor, and also to permit the attachment of other parts, such as removable covers for access holes therethrough and to the rotor.

For a more comprehensive description of the rotor cap and its coaction and cooperation with a helicopter rotor, reference is hereby made to U.S. Pat. No. 3,181,815.

Referring to FIG. 1 we see modern helicopter 10 which comprises fuselage 12 supported from the ground by tricycle type landing gear 14 and 16.

Helicopter rotor 18 is supported for rotation from fuselage 12 and includes a plurality of helicopter blades 20 projecting from the rotor hub 22. To reduce the wake induced vibration problem of the helicopter in high speed flight, rotor cap 24 is placed thereon.

Anti-torque rotor 26 is provided to react the torque of rotor 18. For a more complete description of helicopter 10 or its equivalent and rotor 18, reference is hereby made to U.S. Pat. Nos. 2,517,519 and 2,629,452, respectively.

For a more particular description of rotor cap 24, FIGS. 2 through 5 will now be described. As best illustrated in FIG. 2, rotor cap 24 is generated to dome or cover shape and is of circular cross-section and concentric about axis 30. The rotor cap 24 includes a central aperture 32, and a main body portion 34 of sandwich construction extending substantially laterally from axis 30. Circumferential flange or rim 36 attaches to the main body portion 34 and forms a ring which is substantially parallel to axis 30. The main body portion 34 is of sandwich construction and includes an outer layer 38 of aerodynamic smooth and nonporous material such as resin impregnated fiber glass cloth, a similar inner protective layer 40 and a selective contoured sheet of honeycomb material 42, sandwiched therebetween. Honeycomb core 42 is fabricated to have an inner diameter 44 and an outer diameter 46. A ring of selectively contoured end-grain balsa wood 48 is impressed into honeycomb 42 at its outer diameter 44 so as to serve as the outer boundary and to provide peripheral support thereto. A similar ring of selectively contoured end-grain balsa wood 50 is impressed into honeycomb 42 at its inner diameter 44 so as to provide rigidity and strength at this station. Rings 48 and 50 could also merely be placed adjacent honeycomb core 42. It will be noted that as best shown in FIGS. 2 and 4, the inner ends of cover material 38 and 40 extend inward toward axis 30 from end-grain balsa wood ring 50 and are bonded to one another to form an inner diameter seal and flange 52, which defines the interior diameter 32 of rotor cap 24. Flange 52 may have bolt receiving apertures therein to be aligned with corresponding apertures in cover plate 58 so that cover plate 58 may be attached to rotor cap 24 by any conveniently connecting means as nut and bolt members 60. It will therefore be seen that access into the interior 62 of rotor cap 24 is available by removing connecting members 60 and access plates 58.

By referring to FIGS. 2 and 3, it will be noted that inner and outer protection layers 38 and 40 project beyond outer support ring 48 and are adhesively bonded to one another so as to form circumferential flange or rim 36 extending substantially parallel to axis 30. Just as flange 62 serves as a seal at the inner diameter of sandwich member 34, flange 36 forms a seal at the outer diameter thereof.

Connecting holes 64 are drilled in selective positions about flange 36 and align with corresponding holes 66 in flange member 68 of rotor 22 so as to provide a connection between the rotor cap 24 and rotor 22 to cause rotor cap 24 to rotate with rotor 22.

By examining FIGS. 3 and 4 it will be noted that if desired, extra layers of plastic impregnated fiber glass cloth such as 70 and 72 may be caused to adhere to members 38 and 40 to cooperate therewith in defining rim 36 and to cover the outer diameter 46 of body member 34 for greater reinforcement. At least one extra layer of plastic impregnated fiber glass cloth 74 coacts with protective layer 38 and 40 at the inner diameter 44 of the sandwich member 34 in forming inner diameter flange 52 and the inner end of the sandwich construction for greater rigidity.

As best shown in FIGS. 2 and 5, a series of access holes 76, 78 and 80 extend through sandwich construction 34 at selective positions on rotor cap 24 to provide access to helicopter lubrication points.

Each of these apertures 76–80 has an inner wall 82, 84 and 86 which is defined by the honeycomb structure 42 with a ring of end-grain balsa wood 88, 90 and 92 impressed thereinto and bonded thereto and positioned between and bonded to the protective layers 38 and 40 in a fashion to be described hereinafter.

As best shown in FIGS. 2 and 5, each of these access holes 76–80 has a plurality of drilled holes 100 extending through its end-grain balsa wood supporting rings 88–92 to receive nut and bolt members 60 so as to attach appropriately shaped cover plates, such as 106, over each of the access holes.

To provide another illustration of the honeycomb construction reference is made to FIG. 6 for an isometric view in which the honeycomb sheet core 42 with its various hollow cells or interstices 110 and 112 are defined between the interstices of the solid portion 114 thereof. The honeycomb member is preferably made of aluminum. End-grain balsa wood member 88 is shown impressed into and filling the hollow honeycomb cells so as to form an end-grain balsa wood impregnated honeycomb structure therewith at regions needing reinforcement. Honeycomb sheet 42 with end-grain impregnated balsa wood reinforcement 102 is sandwiched between outer protective layer 38 and inner protective layer 40 and bonded thereto in a fashion to be described hereinafter by bonding layers 116 and 118 so as to form sandwich construction 34.

As stated previously, the use of honeycomb as the core of a sandwich construction provides a highly durable, rigid and light weight structure, however, it has certain problems in connection with the fabrication thereof in that the honeycomb sheet cannot be machined or cut and cannot withstand compressive loads so as to be able to receive a connecting through bolt. In the past, several honeycomb fillers have been used but each has substantial disadvantages as described supra.

It is accordingly a teaching of this invention to provide rigidity to the honeycomb construction by impressing end-grain balsa wood into the honeycomb cells and then cause the end-grain balsa wood so impressed to adhere to the honeycomb structure so that the honeycomb structure so fortified may be machined or otherwise cut. This end-grain balsa wood fortified honeycomb may be molded into selected arcuate shapes so as to be particularly adaptable for use in a sandwich construction with a protective nonporous aerodynamically smooth layer of material both above and below and adhesively attached to the end-grain balsa wood impressed honeycomb sheet core. It has been found that the end-grain balsa wood may be machined or die cut to desired shapes before being impressed into the honeycomb or the honeycomb may be machined after the end-grain balsa wood has been impressed thereinto. It has further been found that where the honeycomb needs to be machined or needs to withstand compressive loads in selected regions only, it is necessary to provide impressed end-grain balsa wood in these regions only.

Referring to FIG. 7 we see an illustration of the method by which the end-grain balsa wood is impressed into the honeycomb. The impression may take place in a conventional press 120, which may be either of the arbor or hydraulic type, and which includes the rigid and fixed supporting plate 122 and a movable compression plate 124 adapted for movement with respect to 122 so as to generate substantial compressive pressure therebetween. Honeycomb sheet 126 is positioned on bottom support plate 128 which rests upon fixed, flat surface 129 of support plate 122. Bottom support plate 128 is set so as to be larger in all dimensions and fabricated of strong materials than honeycomb sheet 126. A sheet of end-grain balsa wood 130 is placed upon the honeycomb sheet 126 so that the grain 132 of the end-grain balsa wood is parallel to and in alignment with the axes 134 of the cells, such as 136, of the honeycomb sheet 126. The end-grain balsa wood sheet 130 is either purchased or previously machined to be of the same height $h$ as the honeycomb sheet and may also be previously machined or die cut to the selected shape such as those illustrated as ring members 88 and 90 in FIG. 5. Top support plate 138 is positioned upon the end-grain balsa wood sheet 130 and is made of a stronger material than and is larger than the end-grain balsa wood sheet 130 in all dimensions. In conventional press operation, movable press member 124 is moved under substantial pressure or force toward fixed support member 122 so that the end-grain balsa wood sheet 130 is caused to be impressed or impregnated into and completely fill the cells 136 of honeycomb sheet 126. After the end-grain balsa wood has been so impressed into the honeycomb, the honeycomb-impressed end-grain balsa wood combination can be machined, cut or contoured to desired arcuate shape.

In order to bond the end-grain balsa wood to the honeycomb, preferably before machining, a coat of some sort of adhesive, such as a low viscosity epoxy resin, is applied to the surfaces of the end-grain balsa wood. This resin will be absorbed into the wood and harden to perform a two-fold function of causing the balsa wood to adhere to the honeycomb and to provide moisture and fungus protection for the end-grain balsa wood. In addition, if a hole is to be drilled through the end-grain balsa wood impressed honeycomb combination, it is considered desirable that a wood sealant such as Poly-ep Epoxy Resin be coated over the exposed balsa wood.

As previously stated this end-grain balsa wood impressed honeycomb is particularly well adapted for use in a sandwich construction wherein a nonporous and smooth sheet of protective material is caused to adhere to the opposite end surface thereof so as to form a sandwich construction therewith.

The fabrication of the rotor cap shown in FIGS. 2–5 will be described to provide the details of the preferred sandwich construction. As best shown in FIG. 8, a female die 150 of selected shape is provided. The outer layer or protective sheet 38 is then laid smoothly against the inner surface of female die 150. Sheet 38 is preferably made of plastic impregnated fiber glass cloth. Any reinforcing layers such as layers 70 and 72 of FIG. 3 and layer 74 of FIG. 4 will be laid into female die 150 at an appropriate time during sandwich construction build-up. The honeycomb member 42 with end-grain balsa wood impressed thereinto as previously described is then laid into the interior of the female die on top of the outer plastic impregnated fiber glass cloth sheet 38. It has been found that the honeycomb sheet 42 with the end-grain balsa wood inserts impressed thereinto can be hand molded into any desired arcuate shape and, thereover, is readily adapted to the contour of die 150. The inner protective sheet member 40 is then smoothly placed along the inner surface of the honeycomb member or core 42. Sheet 40 is also preferably made of plastic impregnated fiber glass cloth, and it will be noted that both sheet 38 and 40 extend beyond the outer diameter 48 of the honeycomb member 42 and abut one another so as to form rim 36 when cured and are preferably continuous so as to extend inwardly of the inner diameter 44 of honeycomb member 42 so as to cooperate in forming flange 52. Protective sheets 38 and 40 cooperate with core 42 to define sandwich construction member 141. The female die 150 with the sandwich construction member 141 therein is then placed within a vacuum bag 152, which is preferably made of polyvinyl alcohol film. The vacuum bag is brought to a vacuum of about 25 inches of mercury by vacuum pump 154 and tested for leaks. This vacuum environment causes the outer and inner layers 38 and 40 to be pressed against honeycomb structure 42 and against each other both inboard and outboard of the honeycomb structure. The female die 150 and contents in its vacuum enviroment of bag 152 is placed into an autoclave and an external pressure of between 20 and 50 p.s.i. is applied thereto within the autoclave. If layers 38 and 40 use polyester as their impregnated plastics, the temperature of autoclave is elevated to 260° F., whereas the autoclave temperature is elevated to 340° F. if the impregnated plastic of layers 38 and 40 is an epoxy. The sandwich construction part 141 being cured is retained in the autoclave at this temperature and pressure condition for between 90 minutes to 2 hours. After this time has elapsed, the autoclave heat is turned off while the vacuum and pressure conditions stated above continue until the autoclave temperature drops to about 100° F., or room temperature.

The die with its contents is then removed from the autoclave and vacuum bag 152 is removed. A conventional trimming tool is then used to trim inner diameter flange 52 and outer diameter flange 36 to their final size and the various holes such as 64 (FIG. 3), 100, 82, 84 and 86 are then drilled. The surface of the end-grain balsa wood which is exposed by this operation is then coated with a sealant such as Poly-ep Epoxy Resin.

While plastic impregnated fiber glass cloth is convenient to use and saves time when assembling the sandwich construction 141 as in FIG. 8, it is also possible to use a dry fiber glass cloth and to use a resin as a separate adhesive such as shown as elements 116 and 118 in FIG. 6. This dry cloth construction has the advantage that it cures at lower temperatures.

While this invention has been primarily described for use in connection with a helicopter rotor cap, it should be noted that it has many other applications where a reinforced honeycomb structure is desired for use in a sandwich construction. An illustration of one such product is shown in FIG. 9, wherein an ammunition box 160 is illustrated. Ammunition box 160 comprises a series of sandwich construction wall members such as front wall 162, side walls 161 and 163 and back wall 165, each of which includes a honeycomb core 164 which is reinforced at each of its edges throughout its periphery by a strip of end-grain balsa wood which is impressed as previously described into the honeycomb cells and as illustrated at 166 in FIG. 10. The various sandwich construction walls 161, 162, 163 and 165 of the box are connected to one another at their edges in conventional fashion such as L-shaped flanges so as to form a completely sealed box, except for its top opening 168.

As best shown in FIG. 11, snap-on cap 170 is provided to cover top opening 168 of ammunition box 160. It will be noted that the end-grain balsa wood strips 172 and 174 are selectively contoured to receive the flexible lips 173 and 175 of top 170 thereover. As further illustrated in FIG. 11, through bolts 176 extend through front sandwich wall 162 and back sandwich wall 165 for the purpose of spacing and supporting those walls, and to increase the compression resistance of the honeycomb in this area, end-grain balsa wood inserts 180 and 182 are impressed into the honeycomb cells. In regions where exceptionally high comprehensive bolt loads are required, enlarged washers such as 184 may be used for load distribution purposes.

The end-grain balsa wood strips impressed into the honeycomb of the sandwich construction walls of ammunition box 160 around the periphery thereto serve to minimize any impact force imparted to the sandwich construction since the use of end-grain balsa wood provides high energy absorption.

While the honeycomb core used herein may be made of any desired cell size or material, I have found that Hexcel honeycomb is particularly well suited for this purpose. In addition, I have found that the end-grain balsa wood of the type known as Balsa Ecuador is particularly well suited and that plastic impregnated fiber glass cloth identified as a low temperature type is quite acceptable for the top and bottom protective layers 38 and 40. Temperature should not exceed 250° F. during cure cycle of sandwich panel.

It is to be understood that the invention is not limited to the specific embodiment herein illustrated and described but may be used in other ways without departure from its spirit as defined by the following claims.

What is claimed is:

1. The method of reinforcing a honeycomb member comprising the steps of:
   (1) providing a honeycomb member of desired characteristics, (2) then placing a piece of end-grain balsa wood adjacent the honeycomb member so that the grain of the end-grain balsa wood is in alignment with the axes of the cells of the honeycomb,
(3) then pressing the end-grain balsa wood into the honeycomb member to fill the cells thereof.

2. The method according to claim 1 wherein the honeycomb member and the end-grain balsa wood piece are sheets of equal heights and including the additional step of applying a layer of adhesive to the balsa wood after the balsa wood has been pressed into the honeycomb so as to cause the balsa wood to adhere to the honeycomb.

3. The method according to claim 1 wherein the honeycomb member and the end-grain balsa wood piece are sheets of equal heights and including the additional step of applying a layer of low viscosity epoxy resin to the balsa wood after the balsa wood has been pressed into the honeycomb so as to cause the balsa wood to adhere to the honeycomb.

4. The method according to claim 1 and including the additional step of machining or otherwise forming the honeycomb member reinforced with the end-grain balsa wood to the finally desired shape.

5. The method according to claim 1 wherein said honeycomb member and said end-grain balsa wood are selected to be sheets of the same height and including the step of forming said end-grain balsa wood to the proper final shape before being impressed into the honeycomb member.

6. The method according to claim 5 and including the additional step of contouring the honeycomb member with the end-grain balsa wood impressed thereinto to selected arcuate shape.

7. The method of reinforcing a honeycomb member comprising the steps of:
  (1) providing a honeycomb member of desired characteristics,
  (2) placing a piece of end-grain balsa wood adjacent the honeycomb so that the grain of the balsa wood is in alignment with the interstices of the honeycomb,
  (3) placing support plates both above and below the honeycomb and end-grain balsa wood so positioned,
  (4) then applying pressure to the support plates so that the end-grain balsa wood will be pressed into the honeycomb filling the interstices thereof.

8. The method according to claim 7 and including the additional step of applying an adhesive to the end-grain balsa wood after the balsa wood has been pressed into the honeycomb for absorption into the balsa wood so as to cause the end-grain balsa wood to adhere to the honeycomb.

9. The method according to claim 7 wherein the end-grain balsa wood is placed on top of the honeycomb member.

10. The method according to claim 7 and including the additional step of machining or otherwise forming the honeycomb member reinforced with the end-grain balsa wood to the finally desired shape.

11. The method of reinforcing a honeycomb member comprising the steps of:
  (1) providing a honeycomb sheet member of desired characteristics and height,
  (2) placing a sheet of end-grain balsa wood of the same height as the honeycomb member adjacent the honeycomb sheet so that the grain of the end-grain balsa wood is in alignment with the interstices of the honeycomb,
  (3) placing support plates both above and below the honeycomb and end-grain balsa wood so positioned,
  (4) then applying pressure to the support plates so that the end-grain balsa wood will be pressed into the honeycomb filling the interstices thereof.

12. The method of fabricating a sandwich construction with a reinforced honeycomb core comprising the steps of:
  (1) providing a honeycomb sheet member of desired characteristics and height,
  (2) placing a sheet of end-grain balsa wood of the same height as the honeycomb member adjacent the honeycomb member so that the grain of the end-grain balsa wood is aligned with the axes of the cells of the honeycomb,
  (3) pressing the end-grain balsa wood into the honeycomb member to fill the cells thereof,
  (4) placing a nonporous protective sheet on opposite sides of said honeycomb member and causing said protective sheets to adhere to said honeycomb member and said end-grain balsa wood.

13. The method of fabricating a sandwich construction with a reinforced honeycomb core comprising the steps of:
  (1) providing a honeycomb sheet member of desired characteristics and height,
  (2) placing a sheet of end-grain balsa wood of the same height as said honeycomb member adjacent the honeycomb member so that the grain of the end-grain balsa wood is aligned with the axes of the cells of the honeycomb,
  (3) pressing the end-grain balsa wood into the honeycomb member to fill the cells thereof,
  (4) placing a layer of nonporous material of selected shape both above and below said honeycomb member so that the nonporous protective sheets extend peripherally beyond said honeycomb member to form flanges projecting therefrom,
  (5) then causing said protective sheets to adhere to said honeycomb member and to said end-grain balsa wood and further causing the skirts of the protective member to adhere to each other so as to produce a peripheral seal and flange for the honeycomb member.

14. The method of fabricating a sandwich construction with a reinforced honeycomb core comprising the steps of:
  (1) providing a honeycomb sheet member of desired characteristics and height,
  (2) placing a sheet of end-grain balsa wood adjacent the honeycomb member so that the grain of the balsa wood is aligned with the axes of the cells of the honeycomb,
  (3) pressing the end-grain balsa wood into the honeycomb member to fill the cells thereof,
  (4) placing a sheet of plastic impregnated fiber glass on opposite sides of said honeycomb member and causing said sheets to adhere to said honeycomb member and said end-grain balsa wood.

15. The method of reinforcing a honeycomb member and producing a sandwich construction comprising the steps of:
  (1) providing a honeycomb member of desired characteristics,
  (2) placing a piece of end-grain balsa wood adjacent the honeycomb so that the grain of the end-grain balsa wood is in alignment with the interstices of the honeycomb,
  (3) placing support plates both above and below the honeycomb and end-grain balsa wood so positioned,
  (4) then applying pressure to the support plates so that the end-grain balsa wood will be pressed into the honeycomb filling the interstices thereof,
  (5) placing a nonporous protective sheet on opposite sides of said honeycomb member and causing said protective sheets to adhere to said honeycomb member and said end-grain balsa wood.

16. The method of reinforcing a honeycomb member and producing a sandwich construction comprising the steps of:
  (1) providing a honeycomb member of desired characteristics,
  (2) placing a piece of end-grain balsa wood adjacent the honeycomb so that the grain of the balsa wood is in alignment with the interstices of the honeycomb, (3) placing support plates both above and below the honeycomb and end-grain balsa wood so positioned, (4) then applying pressure to the support plates so that the end-grain balsa wood will be pressed into the honeycomb filling the interstices thereof, (5) placing a layer of nonporous material of selected shape both above and below said honeycomb member so that the nonporous protective sheets extend peripherally beyond said honeycomb member to form flanges projecting therefrom, (6) then causing said protective sheets to adhere to said honeycomb member and to said end-grain balsa wood and further causing the skirts of the protective member to adhere to each other so as to produce a peripheral seal for said honeycomb member.

17. The method according to claim 13 and including the additional step of fabricating connecting holes in the peripheral seal of the honeycomb member.

18. The method of fabricating a sandwich construction member comprising the steps of:

(1) providing a honeycomb sheet member of desired characteristics including height, (2) then placing a sheet of end-grain balsa wood of the same height as the honeycomb sheet member adjacent the honeycomb sheet member so that the grain of the end-grain balsa wood is aligned with the axes of the cells of the honeycomb sheet member, (3) then pressing the end-grain balsa wood into honeycomb member to fill the cells thereof and thereby provide a core for the sandwich member which is honeycomb sheet with impressed end-grain balsa wood reinforcement, (4) then placing a layer of fiber glass cloth both on top of and beneath the honeycomb core and extending peripherally therebeyond and causing the fiber glass cloth to adhere to the honeycomb core to provide a smooth surface therefor and to seal the opposite ends of the honeycomb cells and to further cause the projections beyond the honeycomb core of the top and bottom fiber glass cloth members to adhere to one another and thereby provide a peripheral seal for the honeycomb core and an attaching flange for the sandwich member.

(5) then cutting desired shapes through the sandwich member at the regions of end-grain reinforcement of the honeycomb sheet.

19. The method of reinforcing a honeycomb member comprising the steps of:

(1) providing a honeycomb member of desired characteristics, (2) placing a piece of end-grain balsa wood adjacent the honeycomb so that the grain of the end-grain balsa wood is in aligment with the interstices of the honeycomb, (3) placing support plates both above and below the honeycomb and end-grain balsa wood so positioned, (4) placing the honeycomb member and the end-grain balsa wood with the support plates placed thereabove and therebelow into a press, (5) then applying pressure to the support plates so that the end-grain balsa wood will be pressed into the honeycomb filling the interstices thereof.

20. The method of producing a sandwich construction member of selected shape comprising the steps of:

(1) providing a honeycomb sheet member of desired characteristics including thickness and shape, (2) placing at least one sheet of end-grain balsa wood of selected shape and of the same thickness as the honeycomb sheet member adjacent the honeycomb member so that the grain of the end-grain balsa wood is in aligment with the axes of the cells of the honeycomb member, (3) pressing the end-grain balsa wood into the honeycomb member to fill the cells thereof and to be flush with the top and bottom thereof so as to form the core of the sandwich construction, (4) providing a die of the selected contour of the sandwich member being fabricated, (5) smoothly placing at least one layer of plastic impregnated fiber glass cloth into the die so as to lie flat against the die inner surface and being of selected size so as to be larger in area than the previously fabricated core, (6) then placing the end-grain balsa wood reinforced honeycomb sheet core into the die on top of the first layer of plastic impregnated fiber glass cloth so that the edges of the cloth extend beyond the core and molding the core to the shape of the die, (7) then applying at least one layer of plastic impregnated fiber glass cloth into the die on top of the core so that the layer is smoothly lying against the core and extending peripherally therebeyond, (8) then placing the die and contents into a vacuum bag and evacuating the bag to 25" of mercury and testing the bag for leaks, (9) then placing the die and contents in the bag so evacuated into an autoclave and pressurizing the autoclave to a pressure of between 20 and 50 p.s.i. and heating the autoclave to a temperature sufficient to cure the plastic impregnated fiber glass cloth and to cause it to adhere to the core member and to cause the fiber glass cloth sections which extend beyond the core member to adhere to one another so as to form a seal and peripheral flange about the core member,

(10) then permitting the autoclave to cool to room tempeature with the vacuum and pressure applied as described above,

(11) then removing the die with contents within the vacuum bag from the autoclave and unbagging the die and contents and remove the contents from the die,

(12) then cutting the contents to desired final shape.

21. The method of producing a sandwich construction member of selected shape comprising the steps of:

(1) providing a honeycomb sheet member of desired characteristics including thickness and shape, (2) placing at least one sheet of end-grain balsa wood of selected shape and of the same thickness as the honeycomb sheet member adjacent the honeycomb member so that the grain of the end-grain balsa wood is in alignment with the axes of the cells of the honeycomb member, (3) pressing the end-grain balsa wood into the honeycomb member to fill the cells thereof and to be flush with the top and bottom thereof so as to form the core of the sandwich construction, (4) providing a die of selected contour of the sandwich member being fabricated, (5) smoothly placing at least one layer of fiber glass cloth impregnated with polyester resin into the die so as to lie flat against the die inner surface and being of selected size so as to be larger in area than the previously fabricated core.

(6) then placing the end-grain balsa wood reinforced honeycomb sheet core into the die on top of the first layer of plastic impregnated fiber glass cloth so that the edges of the cloth extend beyond the core and molding the core to the shape of the die, (7) then applying at least one layer of fiber glass cloth impregnated with polyester resin into the die on top of the core so that the layer is smoothly lying against the core and extending peripherally therebeyond, (8) then placing the die and contents into a vacuum bag and evacuating the bag to 25" mercury and testing the bag for leaks, (9) then placing the die and contents in the bag so evacuated into an autoclave and pressurizing the autoclave to a pressure of between 20 and 50 p.s.i. and heating the autoclave to a temperature about 260° F. for between about 90 and 120 minutes to cure the plastic impregnated fiber glass cloth and to cause it to adhere to the core member and to cause the fiber glass cloth sections which extend beyond the core member to adhere to one another so as to form a seal about the core member,

(10) then permitting the autoclave to cool to room temperature with the vacuum and pressure applied as described above,

(11) then removing the die with contents within the vacuum bag from the autoclave and unbagging the die and contents and removing the contents from the die,

(12) then cutting the contents to desired final shape.

22. The method of producing a sandwich construction member of selected shape comprising the steps of:
  (1) providing a honeycomb sheet member of desired characteristics including thickness and shape,
  (2) placing at least one sheet of end-grain balsa wood of selected shape and of the same thickness as the honeycomb sheet member adjacent the honeycomb member so that the grain of the end-grain balsa wood is in alignment with the axes of the cells of the honeycomb member,
  (3) pressing the end-grain balsa wood into the honeycomb member to fill the cells thereof and to be flush with the top and bottom thereof so as to form the core of the sandwich construction,
  (4) providing a die of the selected contour of the sandwich member being fabricated,
  (5) smoothly placing at least one layer of fiber glass cloth impregnated with epoxy resin into the die so as to lie flat against the die inner surface and being of selected size so as to be larger in area than the previously fabricated core,
  (6) then placing the end-grain balsa wood reinforced honeycomb sheet core into the die on top of the first layer of plastic impregnated fiber glass cloth so that the edges of the cloth extend beyond the core and molding the core to the shape of the die,
  (7) then applying at least one layer of fiber glass cloth impregnated with epoxy resin into the die on top of the core so that the layer is smoothly lying against the core and extending peripherally therebeyond,
  (8) then placing the die and contents into a vacuum bag and evacuating the bag to 25" of mercury and testing the bag for leaks,
  (9) then placing the die and contents in the bag so evacuated into an autoclave and pressurizing the autoclave to a pressure of between 20 and 50 p.s.i. and heating the autoclave to a temperature about 340° F. for between about 90 and 120 minutes to cure the plastic impregnated fiber glass cloth and to cause it to adhere to the core member and to cause the fiber glass cloth sections which extend beyond the core member to adhere to one another so as to form a seal about the core member,
  (10) then permitting the autoclave to cool to room temperature with the vacuum and pressure applied as described above,
  (11) then removing the die with contents within the vacuum bag from the autoclave and unbagging the die and contents and remove the contents from the die,
  (12) then cutting the contents to desired final shape.

23. The method of producing a sandwich construction of selected shape comprising the steps of:
  (1) providing a honeycomb sheet member of desired characteristics including thickness and shape,
  (2) placing at least one sheet of end-grain balsa wood of selected shape and of the same thickness as the honeycomb sheet member adjacent the honeycomb member so that the grain of the end-grain balsa wood is in alignment with the axes of the cells of the honeycomb member,
  (3) pressing the end-grain balsa wood into the honeycomb member to fill the cells thereof and to be flush with the top and bottom thereof so as to form the core of the sandwich construction,
  (4) providing a die of the selected contour of the sandwich member being fabricated,
  (5) smoothly placing at least one layer of plastic impregnated fiber glass cloth into the die so as to lie flat against the die inner surface and being of selected size so as to be larger in area than the previously fabricated core,
  (6) then placing the end-grain balsa wood reinforced honeycomb sheet core into the die on top of the first layer of plastic impregnated fiber glass cloth so that the edges of the cloth extend beyond the core and molding the core to the shape of the die,
  (7) then applying at least one layer of plastic impregnated fiber glass cloth into the die on top of the core so that the layer is smoothly lying against the core and extending peripherally therebeyond,
  (8) then placing the die and contents into a vacuum bag and evacuating the bag to 25" of mercury and testing the bag for leaks,
  (9) then placing the die and contents in the bag so evacuated into an autoclave and pressurizing the autoclave to a pressure of between 20 and 50 p.s.i. and heating the autoclave to a temperature sufficient to cure the plastic impregnated fiber glass cloth and to cause it to adhere to the core member and to cause the fiber glass cloth sections which extend beyond the core member to adhere to one another so as to form a seal and peripheral flange about the core member,
  (10) then permitting the autoclave to cool to room temperature with the vacuum and pressure applied as described above,
  (11) then removing the die with contents within the vacuum bag from the autoclave and unbagging the die and contents and remove the contents from the die,
  (12) then cutting the peripheral flange to final shape and drilling connecting apertures therethrough, and
  (13) cutting selectively shaped apertures through the sandwich member in the region of the end-grain balsa wood impressed honeycomb.

References Cited

UNITED STATES PATENTS

| | | | |
|---|---|---|---|
| 2,305,817 | 12/1942 | Sukohl | 161—Cell. Dig. |
| 3,078,948 | 2/1963 | Gildard et al. | 161—Cell. Dig. |
| 3,425,885 | 2/1969 | Webb | 161—68X |
| 3,437,547 | 4/1969 | Sullivan | 161—38X |
| 3,475,262 | 10/1969 | Sargent et al. | 161—68 |

REUBEN EPSTEIN, Primary Examiner

U.S. Cl. X.R.

156—196, 197, 228, 303.1; 161—68; 264—268